July 7, 1942.  C. P. DEIBEL  2,289,249

DRY CELL BATTERY

Filed July 2, 1941

INVENTOR.
CYRIL P. DEIBEL
BY William E. Chilton
ATTORNEY.

Patented July 7, 1942

2,289,249

UNITED STATES PATENT OFFICE 2,289,249

DRY CELL BATTERY

Cyril P. Deibel, Lakewood, Ohio

Application July 2, 1941, Serial No. 400,773

2 Claims. (Cl. 136—133)

This invention relates generally to a dry cell battery which is particularly adapted for use with flashlights and which is also suitable for any use where leak-proof or substantially leak-proof dry cells are required.

One of the objects of the invention is to provide a battery which contains one or more dry cells which are enclosed within a suitable casing or sheath in such a manner as to permit excessive pressure within the battery to be relieved while preventing or reducing to a minimum the leakage of the liquid contents of the cell and at the same time preventing ingress of outside air into the cell or cells.

A further object of the invention is to provide a dry cell battery which preferably comprises a zinc cup containing suitable depolarizing mix, an electrolyte and a carbon electrode and which is closed by an imperforate metal closure, which is held in liquid-tight sealing relation with the cup, and which has electrical contact with the carbon electrode and is electrically insulated from the cup; together with a metal sheath which surrounds the cup and is insulated from both the cup and the metal closure and which holds the metal closure in place in such a manner that excessive pressure within the cell may be relieved without leakage of the liquid contents of the cell.

A still further object of the invention is to provide a dry cell which comprises an outer electrode preferably in the form of a zinc cup the upper edge of which is deflected inwardly and which receives thereover a sealing member or gasket which is formed of rubber or other suitable material together with an imperforate metal cap or closure resting on said gasket and held in somewhat resilient contact therewith by a metal sheath, the metal cap serving to close both the zinc cup and the metal sheath and cooperating therewith so as to provide means for venting the excessive pressure within the cell without permitting any substantial leakage of the liquid contents of the cell, the metal cap being insulated from both the metal sheath and the cup but having electrical contact with the carbon electrode.

A further object of the invention is to provide a dry cell having the above described distinguishing features and characteristics and which is well adapted for quantity production at comparatively low cost.

Figure 2:
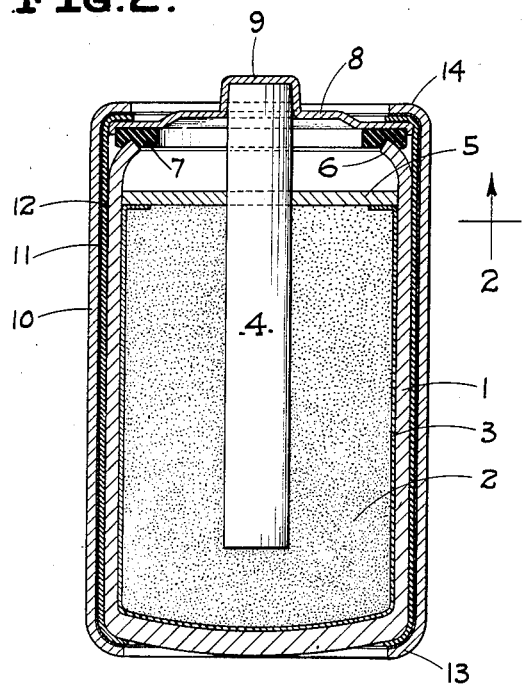
Figure 1:
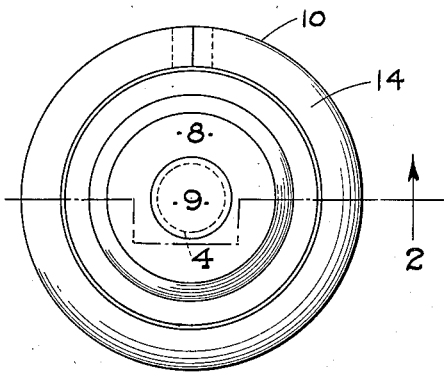
Figure 3:
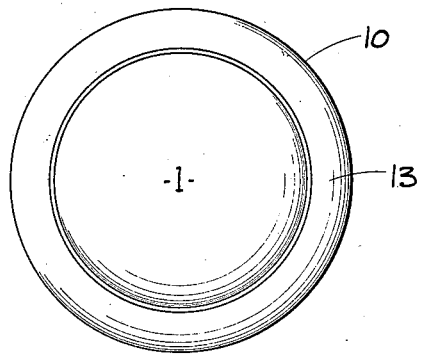
Figure 4:
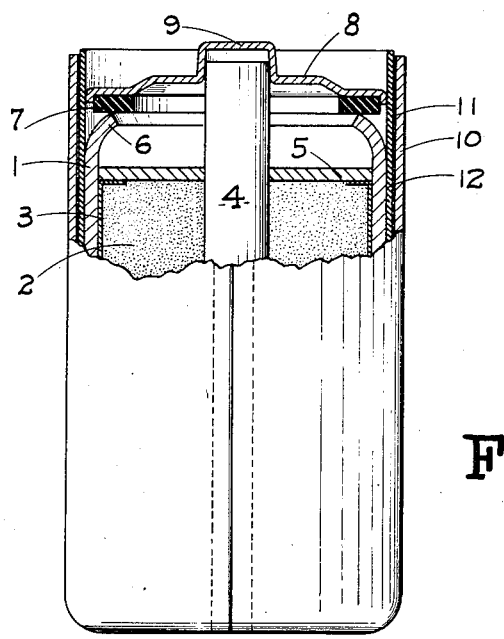

Further and more limited objects of the invention will appear as the description proceeds and by reference to the accompanying drawing in which Fig. 1 is a top plan view of a dry cell embodying the features of my invention; Fig. 2 is a vertical sectional view on the line 2—2 of Fig. 1; Fig. 3 is a bottom plan view of the cell; and Fig. 4 is a view partly in section and partly in elevation before the metal closing member is permanently secured in place.

Referring now to the drawing, the reference character 1 designates an extruded zinc cup the bottom wall of which is of substantially greater thickness than the side wall thereof. The zinc cup contains a mass of depolarizing mix 2 which is enclosed by a paper liner 3 and receives therein a carbon electrode 4. Disposed over the top of the mix and surrounding the carbon electrode is a washer 5 formed of paper or the like. The upper end of the cup is deflected inwardly as shown at 6 so as to provide a sharp peripheral edge.

Resting on the peripheral edge of the cup is a relatively thick washer 7 which is preferably formed of rubber or some other suitable electrical insulating material. Fitting over the washer 7 is an imperforate metal cap or closure 8 having a peripheral flange thereon which serves to receive and position the washer 7. The metal cap 8 has a recess or shouldered portion 9 which receives the upper end of the carbon electrode therein. Surrounding the cell is a tubular metal sheath 10 which is preferably coated on the interior thereof with a thin layer 11 of lacquer or the like. Fitting within the tubular metal sheath is a liner 12 which is preferably formed of "Pliofilm" or other suitable electrical insulating material. Pliofilm is hydrochlorinated rubber, that is, rubber to which hydrogen chloride has been added. It is a good insulator, strong and somewhat stretchable, tear resistant and impervious to gas and liquids and is not affected by hydrocarbons and is capable of being fused by the application of heat. The liner 12 is slightly longer than the tubular member and extends beyond the ends thereof.

In assembling the cell, the mix and carbon electrode are first inserted into the zinc cup and the upper peripheral edge of the cup is then deflected inwardly. The rubber washer or gasket 7 is then placed over the end of the cup in engagement with the rather sharp peripheral edge thereof. The imperforate metal cap is then placed over the carbon electrode in the position shown in Fig. 4. The cell is then inserted within the outer metal sheath or casing 10, the lower end of the sheath having first been deflected over inwardly as indicated at 13. The cell is then placed within a suitable fixture and pressure is applied to the metal closure 8 to move it to the position shown in Fig. 1. The upper end of the tubular metal sheath 10 is then spun over inwardly, as indicated at 14 in Fig. 1.

It will be noted that the washer 5 is disposed a short distance below the top of the cell and serves to provide a gas chamber. It will also be noted that the liner 12 is folded over the top of the metal closure and also over the bottom of the zinc cup and serves to insulate the zinc cup from the metal sheath. The coating of lacquer serves as a further electrical insulating medium to prevent electrical contact between the zinc cup and the metal sheath. It will be noted also that the upper sharp peripheral edge of the zinc cup bites into the rubber gasket as will appear most clearly from Fig. 1, so as to provide an effective seal for preventing ingress of air into the cell and also to substantially prevent the escape of any of the liquid contents of the cell. The rubber gasket 7 cooperates with the upper peripheral edge of the cup and the imperforate metal closure 8 to provide a somewhat resilient sealing means which permits excessive pressure within the cell to be relieved. The rubber washer is sufficiently porous to permit gas pressure to escape therethrough while preventing the liquid contents of the cell from escaping to any substantial degree. It will be seen that the zinc cup is thoroughly and completely insulated from the outer metal shell as well as from the imperforate metal cap and that a liquid-tight joint is provided at the opposite ends of the metal sheath.

It will now be clear that I have provided a dry cell which will accomplish the objects of the invention as hereinbefore stated. It will of course be understood that various changes may be made in the details of construction as well as in the specific materials used without departing from the spirit of the invention, and that the embodiment of the invention herein disclosed is to be considered merely as illustrative and not in a limiting sense, as the invention is limited only in accordance with the scope of the appended claims. It is contemplated that two or more cells may be used within a single metal sheath, if necessary or desirable.

Having thus described my invention, what I claim is:

1. A dry cell comprising a zinc cup containing a mass of mix, an electrolyte and a carbon electrode, the upper end of said cup being deflected inwardly so as to provide a sharp upstanding peripheral edge formed by the corner between the side and end of said cup, a rubber gasket of substantial thickness and some porosity engaging said peripheral edge, an imperforate metal cap disposed over said gasket and having good electrical contact with said carbon electrode but insulated from said cup, said cup having an annular flat portion adjacent the outer edge thereof terminating in a downturned flange engaging the peripheral edge of said gasket and serving to position the same, a tubular metal sheath surrounding said cup and having one end deflected inwardly over said cap substantially horizontally and its opposite end deflected inwardly over the bottom edge of said cup, a thin lining of insulating material insulating said tubular sheath from both said cap and said cup, the upper sharp peripheral edge of said cup being embedded in said rubber gasket and providing valve means permitting excessive pressure to be relieved but preventing ingress of outside air, the inwardly deflected upper edge of said sheath being folded over the downturned flange on said metal cap and serving to compress said gasket against the sharp peripheral edge of said cup.

2. A dry cell comprising a zinc cup containing a mass of mix, an electrolyte and a carbon electrode, the upper end of said cup being deflected inwardly so as to provide a sharp upstanding peripheral edge, a rubber gasket of substantial thickness engaging said peripheral edge, an imperforate metal cap disposed over said gasket and having good electrical contact with said carbon electrode but insulated from said cup, said cap having a downturned flange engaging the peripheral edge of said gasket and serving to position the same, a tubular metal sheath surrounding said cup and having one end deflected inwardly over said cap substantially horizontally and its opposite end deflected inwardly over the bottom of said cup, a thin insulating cover formed of a distensible material which is impervious to gas and liquids, and which is not materially affected by hydrocarbons insulating said tubular sheath from both said cap and said cup, the upper sharp peripheral edge of said cup being embedded in said rubber gasket and providing valve means permitting excessive pressure to be relieved but preventing ingress of outside air, said gasket being compressed between the sharp peripheral edge of said cup and the substantially flat inwardly deflected portion of the adjacent end of said sheath.

CYRIL P. DEIBEL.